June 4, 1963
E. B. ERICKSON
3,091,801
AUTOMATIC CARCASS LOADER FOR TIRE PRESSES
Filed March 16, 1961
5 Sheets-Sheet 1
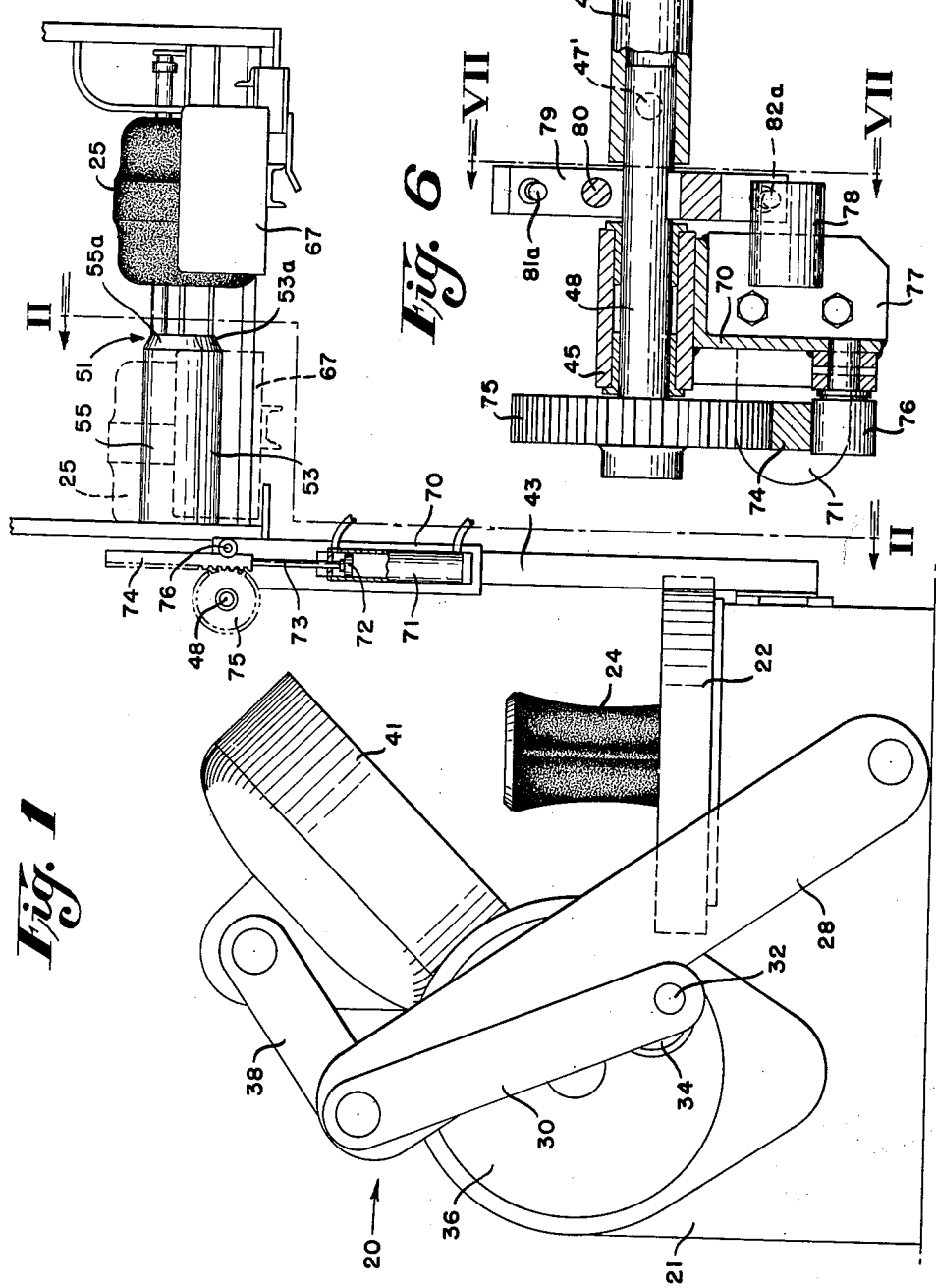
INVENTOR.
EDWARD B. ERICKSON
BY *Willard R. Sprowls*
ATTORNEY.

June 4, 1963   E. B. ERICKSON   3,091,801
AUTOMATIC CARCASS LOADER FOR TIRE PRESSES
Filed March 16, 1961   5 Sheets-Sheet 2
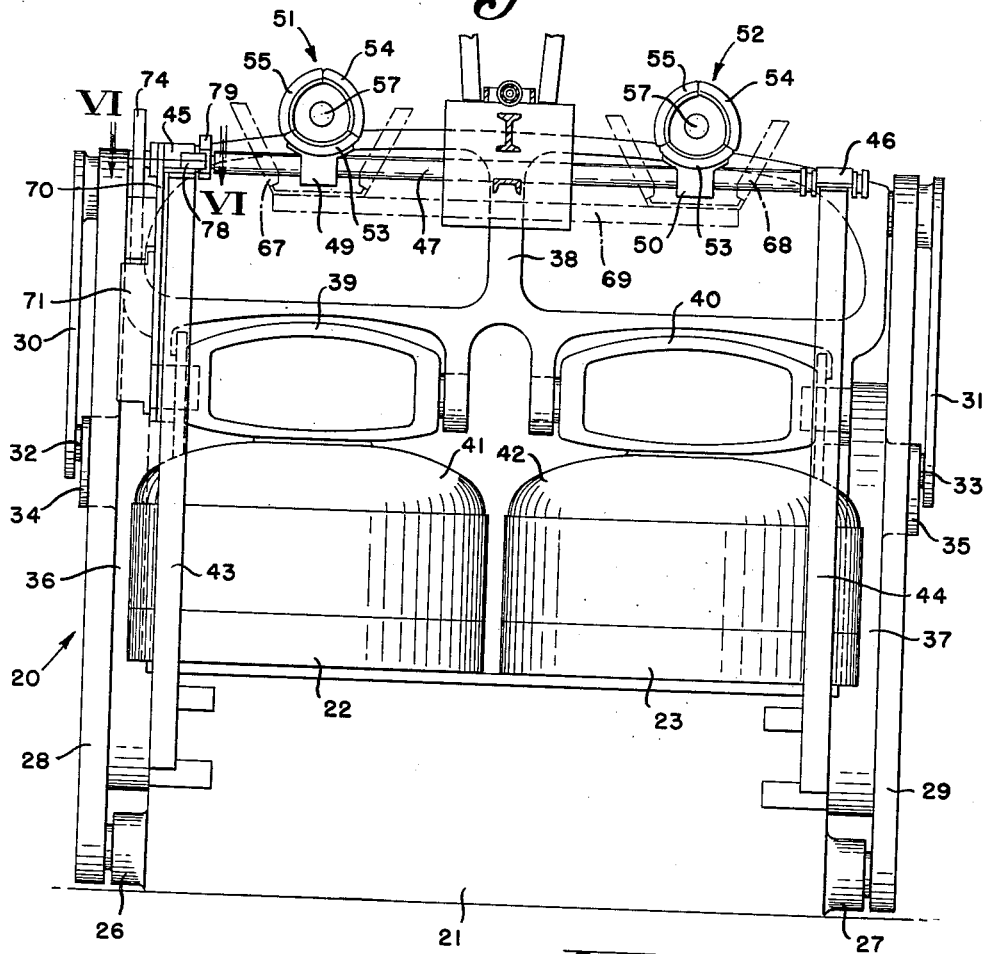
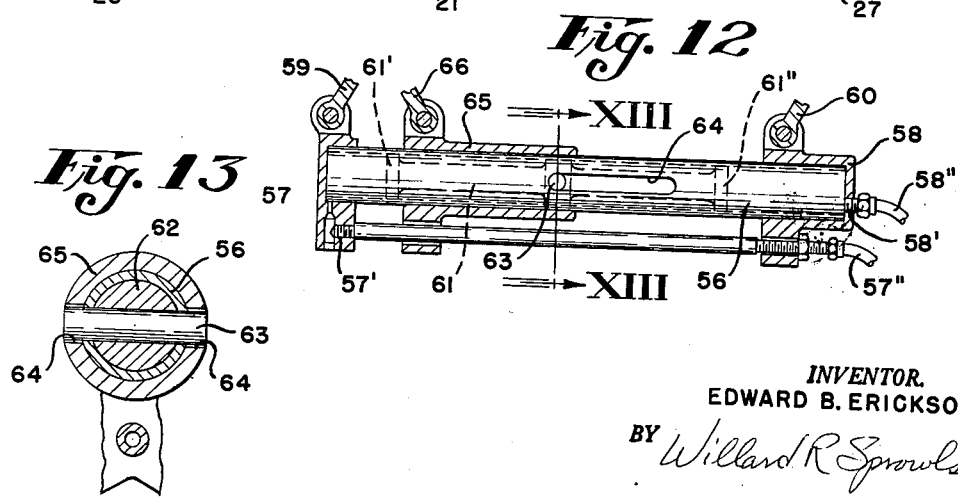
INVENTOR.
EDWARD B. ERICKSON
BY Willard R. Sprowls
ATTORNEY.

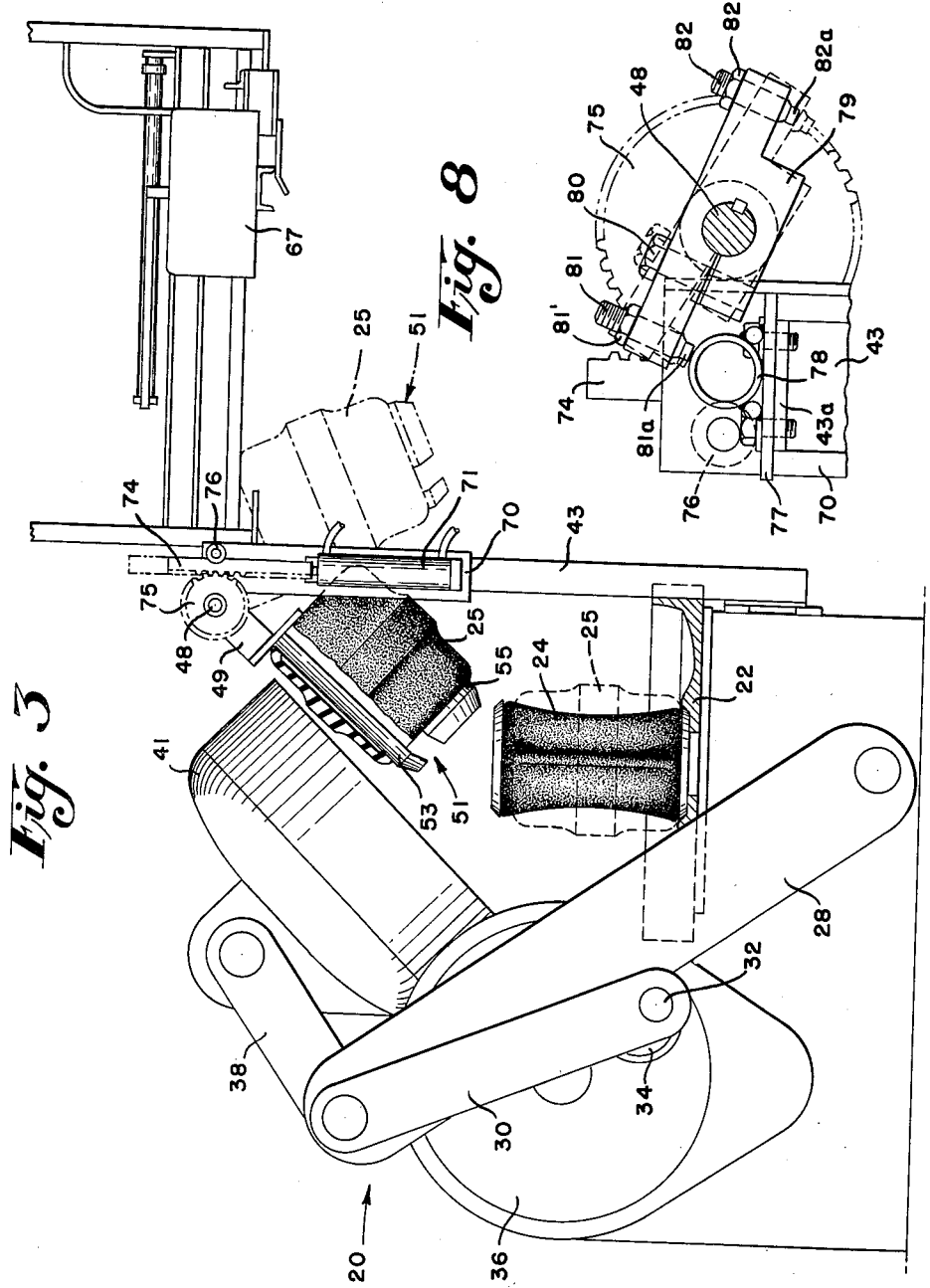

June 4, 1963
E. B. ERICKSON
3,091,801
AUTOMATIC CARCASS LOADER FOR TIRE PRESSES
Filed March 16, 1961
5 Sheets-Sheet 4
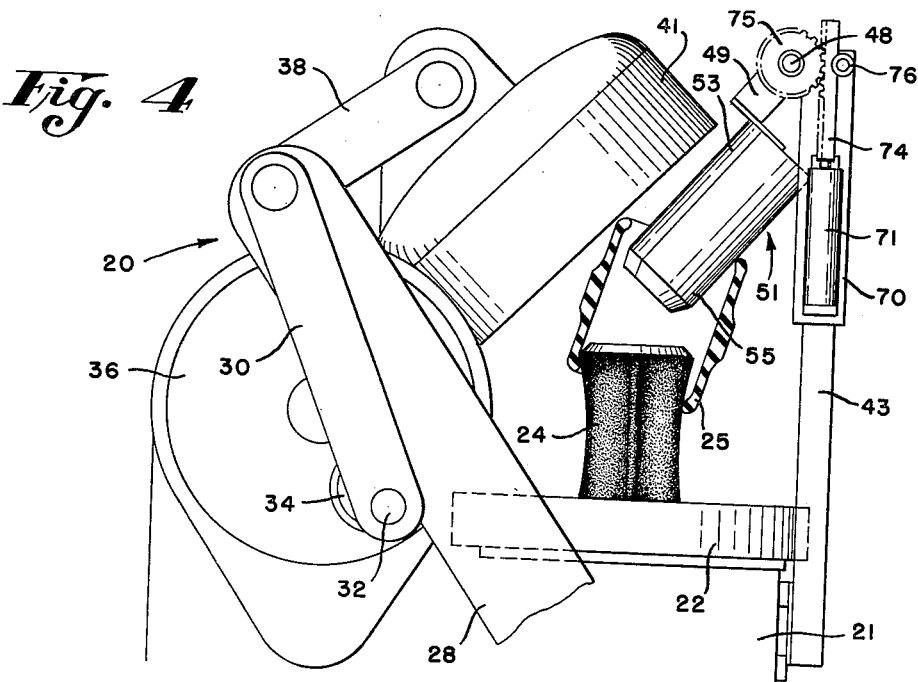
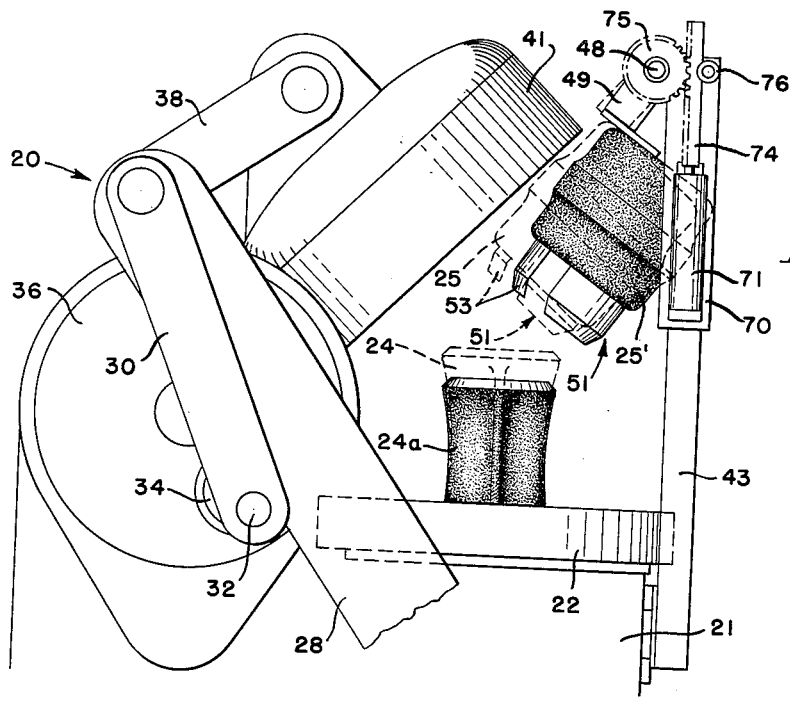
INVENTOR.
EDWARD B. ERICKSON
BY Willard R. Sprowls
ATTORNEY.

June 4, 1963
E. B. ERICKSON
3,091,801
AUTOMATIC CARCASS LOADER FOR TIRE PRESSES
Filed March 16, 1961
5 Sheets-Sheet 5
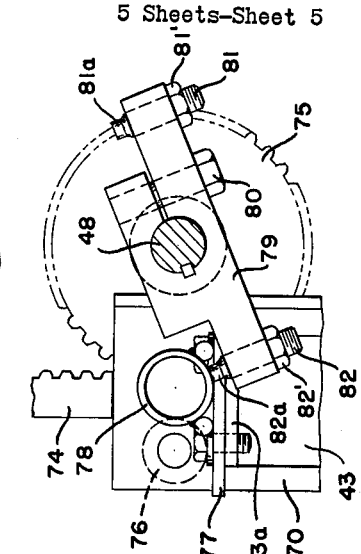
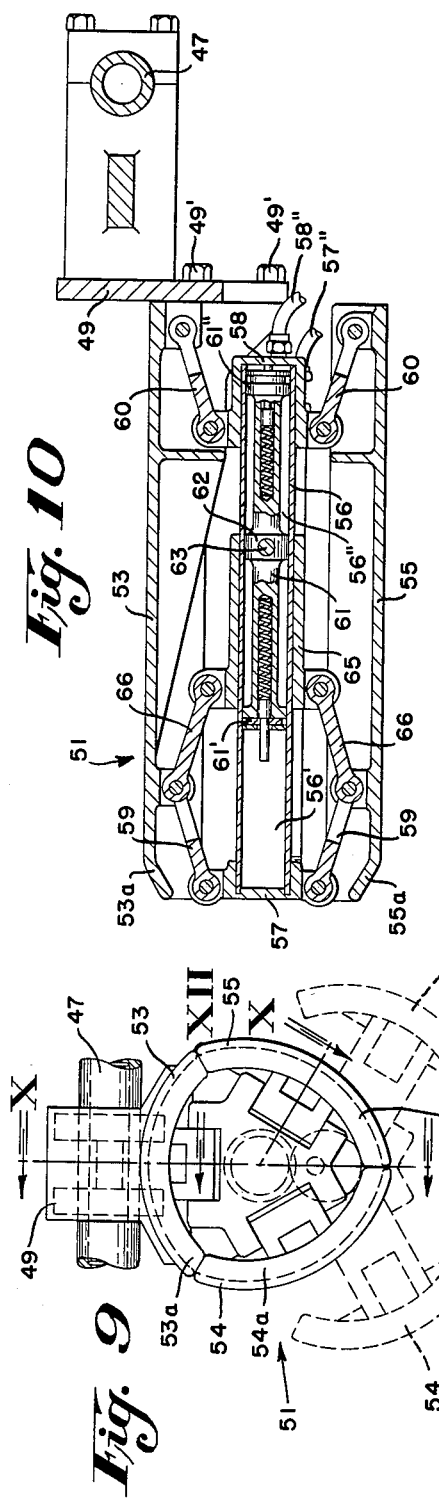
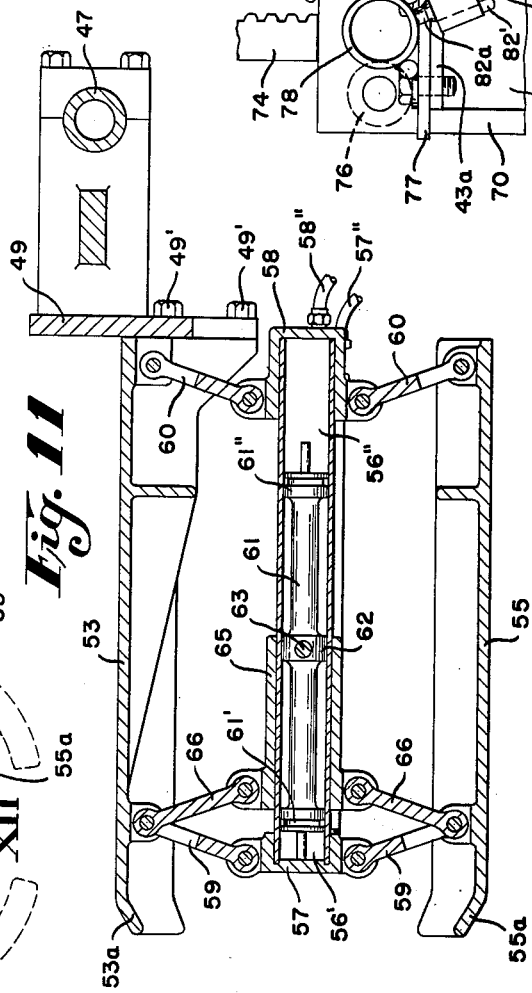
INVENTOR.
EDWARD B. ERICKSON
BY *Willard R. Sprowls*
ATTORNEY.

3,091,801
AUTOMATIC CARCASS LOADER FOR
TIRE PRESSES
Edward B. Erickson, Grosse Pointe, Mich., assignor to United States Rubber Company, New York, N.Y., a corporation of New Jersey
Filed Mar. 16, 1961, Ser. No. 96,289
4 Claims. (Cl. 18—2)

This invention relates to presses having separable mold sections for the shaping and vulcanizing of pneumatic tires, and in particular to means for automatically loading such presses with raw tire carcasses.

There are presently available to the tire industry a number of presses in which tires are cured and shaped. One type of press for this purpose is generally known in the trade under the name "Bag-O-Matic" press, which may be a single cavity or dual cavity structure. Each cavity structure of such a press is provided with a horizontal stationary lower mold section supporting an upstanding curing bag and with an upper mold section which can be moved toward and away from the lower mold section. In the usual constructions of these presses, the upper mold section moves linearly, i.e. axially of itself and the lower mold section and parallel to the latter, when in the immediate vicinity of the lower mold section, and angularly when more than a certain linear distance from the lower mold section. The linear movement of the upper mold section toward the lower mold section thus ensures the proper deformation of the initially cylindrical carcass into tire shape, while the angular movement of the upper mold section away from the lower mold section effects the final opening of the press for removing the cured tire and inserting the next uncured carcass.

In the "Bag-O-Matic" presses as originally developed and later refined, the upper mold section is arranged for an angular movement ranging between about 45° and 60°. These presses are not equipped with automatic loading means. Each carcass to be shaped and cured must be placed over the curing bag by hand, and each finished tire must be removed by hand, which is inherently a cumbersome, slow, inefficient and highly uneconomical procedure.

To overcome this substantial drawback, and thus to provide a "Bag-O-Matic" press which is fully automated, i.e. equipped with an automatic loading system, a press construction was developed in which the press opening mechanism is such as to increase the extent of angular movement of the upper mold section to about 90°. As a result, a "Bag-O-Matic" press embodying this new construction has room at the top to permit a carcass to be dropped vertically over the curing bag. The loading system for such a press includes an elongated, four-segment, expansible and collapsible chuck which can be inserted in its closed or collapsed condition into a raw tire carcass disposed at a supply location outside the press, expanded to grip the carcass from the inside, swung over to the opened press so as to be in vertical alignment with the curing bag, and then again collapsed to permit the carcass to drop down over the curing bag in the lower mold section.

The completely automated 90° or full-opening new "Bag-O-Matic" presses have been very successful in bringing about substantial economies in tire manufacture. Inasmuch as the many old 45° and 60° or semi-opening, manually loaded "Bag-O-Matic" presses represent large capital investments of tire producers, however, and thus cannot be summarily scrapped, attempts have been made to automate these presses also. Heretofore these attempts have not been successful, since the cost of replacing the old press-opening mechanisms with the newer arrangements permitting full opening of the presses would be prohibitive, and with the tilted upper mold sections blocking the way, the new vertical loading system is completely useless.

It is, therefore, the principal object of the present invention to provide means enabling the old and hitherto manually loaded "Bag-O-Matic" presses to be fully automated.

A more specific object of the present invention is the provision of an automatic tire press loading system which is adapted for use with semi-opening "Bag-O-Matic" presses of the 45° and 60° types.

Another object of the present invention is the provision of such an automatic tire press loading system the operation of which can be adjusted to take into account the use of different size mold sections and curing bags in the production of correspondingly different size tires.

Broadly, the objects of the present invention are attained by the provision, in association with each tire mold of a semi-opening "Bag-O-Matic" tire press, of a multi-segmental, expansible and collapsible carcass transfer chuck which can be swung through an angle of more than 90 degrees from a generally horizontal carcass-receiving position to a downwardly inclined carcass-discharging position. Means are provided for collapsing the chuck until surrounded by a carcass, for expanding the chuck at that time to grip the carcass from within, for swinging the chuck and gripped carcass through a downward arc until it extends angularly into the opening of the press, and for again collapsing the chuck so as to permit the carcass to slide off it and into the press mold. The arrangement is such that the carcass can slide off the chuck angularly onto the vertical curing bag of the mold so as to settle down into its final position at a relatively slow speed resulting from the frictional contact between the carcass and the bag. After the carcass is in the mold, reversal of the chuck-swinging means returns the chuck to its initial carcass-receiving position. To enable the same loading system to be employed for manufacturing tires of different sizes, means are provided for correspondingly adjusting the magnitude of the angular swinging movement of the transfer chuck.

As previously stated, however, the 90° "Bag-O-Matic" presses now in use are associated with loading systems which include as essential elements four-segment transfer chucks. A chuck of that type is basically characterized by the fact that in expanding or collapsing the chuck all the segments move jointly and equally away from or toward the centrally located operating cylinder thereof. Attempts have been made to employ such a chuck in the implementation of the aforesaid principles of the present invention, but without success since it is practically impossible to achieve any positive and predictable control over the sliding of the carcass off a multi-segment chuck and onto the curing bag where all of the segments of the chuck move at the same time. Stated in other words, when an expanded, carcass-gripping chuck of the aforesaid type is oriented at a downward slant into a "Bag-O-Matic" press mold, as required by the present invention, and is then collapsed, it does not provide each carcass to be cured with a slide surface which is both stationary relative to the curing bag during the carcass movement and always in the same positive relative to the curing bag so as to ensure that all carcasses drop over the curing bag in a uniform manner.

It is also an important object of the present invention, therefore, to provide a novel transfer chuck construction for an automatic loading system for "Bag-O-Matic" presses.

A further important object of the present invention is the provision of a collapsible and expansible multi-segment carcass transfer chuck for the stated purposes which is so arranged and constructed that one of its segments is stationary during collapse and expansion of the chuck.

More specifically, it is an object of the present invention to provide a multi-segment chuck in which the stationary segment is uppermost when a carcass is being loaded into the press mold.

Concurrently, it is an object of the present invention to provide such multi-segment transfer chucks in which the stationary segment is upermost when a carcass is being loaded into the press mold and lowermost when a carcass is being picked up at the supply location.

The foregoing and other objects, characteristics and advantages of the present invention will be more clearly understood from the following detailed description thereof when read in conjunction with the accompanying drawings, in which:

FIG. 1 is a side elevational view of a dual type 45° or 60° "Bag-O-Matic" press in its open condition and shows a transfer chuck of the novel construction provided by this invention collapsed and ready for receiving a raw tire carcass from a conveyor for the latter;

FIG. 2 is a front elevational view of the press, taken along the line II—II in FIG. 1, and shows the press in its closed condition;

FIG. 3 is a side elevational view of the press similar to FIG. 1 and shows the transfer chuck expanded and in its discharging position preparatory to loading a tire carcass into the press;

FIG. 4 is a fragmentary side elevational view of the structure shown in FIG. 3 and shows the transfer chuck in collapsed condition for releasing the tire carcass and permitting the same to slide onto the curing bag in the associated lower mold section of the press;

FIG. 5 is a view similar to FIG. 3 and illustrates the operation of the loading system of the press with tire carcasses of different sizes;

FIG. 6 is a sectional view, on an enlarged scale, taken along the line VI—VI in FIG. 2;

FIG. 7 is a sectional view taken along the line VII—VII in FIG. 6;

FIG. 8 is a sectional view similar to FIG. 7 but shows the chuck position-determining elements of the loading system in a different operating position thereof;

FIG. 9 is an end view of a transfer chuck as seen in its discharging position from the direction in which the tire carcasses slide off the same and onto the curing bag;

FIG. 10 is a sectional view taken along the line X—X in FIG. 9 and shows the chuck in its collapsed condition;

FIG. 11 is a sectional view similar to FIG. 10 and shows the chuck in its expanded condition;

FIG. 12 is a sectional view taken along the line XII—XII in FIG. 9; and

FIG. 13 is a sectional view, on an enlarged scale, taken along the line XIII—XIII in FIG. 12.

Referring now more particularly to FIGS. 1 to 5 of the drawings, it will be seen that a tire shaping and vulcanizing press 20 of the "Bag-O-Matic" type to which the present invention pertains comprises a suitably rigid base 21 which supports a pair of horizontally disposed upwardly opening tire mold sections 22 and 23 designed to constitute the lower halves of the complete tire molds. Positioned within the confines of the mold sections 22 and 23 and extending axially upwardly therefrom are two tire shaping or curing bags 24 (only one of which is shown) about which the uncured tire bands or carcasses 25 are initially positioned at the start of the curing operation, as shown in phantom in FIG. 3. Pivotally mounted at their lower ends in two bosses 26 and 27 extending from the press base 21 are two long linkage arms 28 and 29 which at their upper ends are pivotally connected to two relatively shorter linkage arms 30 and 31 at one end of each of the latter. The other ends of the linkage arms 30 and 31 are connected by means of a pair of crank pins 32 and 33 to a pair of small cam wheels 34 and 35 which are rotatably carried eccentrically by a pair of main cam wheels 36 and 37 adapted to be rotated by means of a motor (not shown) in a conventional manner.

Between the linkage arms 28 and 29 and pivotally carried thereby at the upper ends thereof is a main yoke 38 which extends across the entire width of the press. The yoke 38 pivotally supports two smaller yokes 39 and 40 (see FIG. 2) which carry, respectively, two dome-shaped downwardly opening mold sections 41 and 42 designed to constitute the upper halves of the two tire molds. The upper mold sections 41 and 42 can be moved both linearly and angularly between their open positions as shown in FIGS. 1, 3, 4 and 5 and their closed positions as shown in FIG. 2 through the intermediary of the elements 28 to 40 acting in concert with certain other structures (not shown) in a manner which is well known in the art and thus need not be explicitly described herein.

The "Bag-O-Matic" press 20 illustrated in the drawings is of the semi-opening type, i.e. where the press-opening angular movement of the upper mold sections is between about 45° and 60° from the horizontal, since it is with such a press, heretofore always manually loaded, that the automatic loading system according to the present invention finds its greatest utility. Nevertheless it is to be understood that this loading system is adapted to be employed just as well with a full-opening "Bag-O-Matic" press, i.e. where the press-opening angular movement of the upper mold sections is about 90° from the horizontal.

Referring now particularly to FIGS. 1, 2 and 3, affixed to the press base 21 adjacent the opposite sides thereof and extending upwardly therefrom are two rigid support members 43 and 44 at the upper ends of which are provided bearings 45 and 46. A hollow cross-shaft 47 is rotatably journaled at one end in the bearing 46 and at its other end is fixedly connected by means of a pin 47' (see FIG. 6) to a jack shaft 48 which is journaled in the bearing 45. The cross-shaft 47 supports, at spaced locations above the respective molds 22—41 and 23—42, two mounting plates 49 and 50 which are fixed to the shaft in any suitable manner and carry the two transfer chucks 51 and 52 of the press loading system, as will now be more fully described.

The two chucks 51 and 52 are identical in all respects, and thus only one of them will be described in detail at the present time. As clearly shown in FIGS. 2 and 9 to 11, the chuck 51 in the illustrated embodiment of the invention is constructed of three parallel, arcuate segments 53, 54 and 55 which, when in longitudinal edge to edge abutting relationship, form an elongated, tube-like body of not quite circular cross-section. The segments 53, 54 and 55 are bent or chamfered inwardly of the chuck at their respective front or free ends 53a, 54a and 55a, for a purpose to be more clearly explained hereinafter. The segment 53 of the chuck 51 at its rear end is rigidly connected to the mounting plate 49 by bolts 49'. (The segment 53 of the chuck 52 is similarly connected to the mounting plate 50.)

Positioned substantially centrally within the confines of the chuck 51 is a double-acting pneumatic cylinder 56 the opposite ends of which are closed by caps 57 and 58. Articulated at one end to each of the chuck segments 53, 54 and 55 adjacent the front and rear ends of the latter are links 59 and 60, the links 59 being articulated at their other ends to the end cap 57 of the cylinder 56, and the links 60 being articulated at their other ends to the end cap 58 of the cylinder 56. Reciprocally slidably disposed within the cylinder 56 is an elongated piston 61 having a pair of end heads 61' and 61" which define together with the respective end caps 57 and 58 of the cylinder 56 a pair of pressure spaces 56' and 56" into which compressed air or like fluid pressure medium can be admitted for displacing the piston. To this end, the caps 57 and 58 are provided with ports 57' and 58' which communicate with a suitable source of fluid pressure (not shown) via conduits 57" and 58".

The piston 61 is further provided intermediate its ends with an enlarged head or peripheral flange 62 through which extends a cross-pin 63. The cylinder 56 is provided on opposite sides thereof with a pair of diametrically opposed, longitudinally extending slots 64 in which the opposite ends of the cross-pin 63 are slidably received (see FIGS. 12 and 13). The pin 63 projects beyond the outer surface of the cylinder 56 and is connected at its opposite ends to a sleeve 65 slidably mounted on the cylinder. The piston 61 is, therefore, positively connected to the sleeve 65 so that the latter may be reciprocated along the cylinder jointly with the movement of the piston in the cylinder. Links 66 are articulated at one end to the sleeve 65 at peripherally spaced locations thereon and at their other ends to the segments 53, 54 and 55 essentially at the same locations as the links 59 (see FIGS. 10 and 11).

From the foregoing it will be understood that when the piston 61 is in the position illustrated in FIG. 10, i.e. when fluid pressure is admitted into the cylinder chamber 56' through the conduit 57'', the chuck 51 assumes its closed or collapsed condition illustrated in solid lines in FIG. 9. When, on the other hand, fluid pressure is admitted into the cylinder chamber 56'' through the conduit 58'' to move the piston 61 into the position thereof shown in FIG. 11, the sleeve 65 moving with the piston 61 causes the chuck to assume its open or expanded condition illustrated in broken lines in FIG. 9. As can be readily seen from FIGS. 2, 9, 10 and 11, during any chuck-expanding or chuck-collapsing action of the piston 61, the chuck segment 53 remains essentially stationary while the segments 54 and 55 together with the cylinder 56 move away from or toward it. This feature constitutes one of the important aspects of the present invention, and reference to it will be had more explicitly hereinafter in connection with the description of the operation of the loading system. Moreover, reverting again to the matter of the peripheral shape of the chuck, although the tube defined by the segments 53, 54 and 55 is not truly circular in cross-section, the high points of the segments are all located on the circle centered at the axis of the cylinder 56 and piston 61. This relationship is maintained even when the chuck is expanded, i.e. when the segments 54 and 55 move away from the segment 53 they move in such a manner that the high points of the three segments remain on a common circle centered at the axis of the cylinder and piston despite the fact that the circle is bigger than before and that its center has been shifted away from the stationary segment 53. The illustrated construction actually ensures that the chuck expands and collapses uniformly since the axis or center line of the cylinder 56 and piston 61 always and only moves in the longitudinal center plane of the stationary chuck segment 53, as indicated in phantom outline in FIG. 9.

Referring again to FIGS. 1 and 2, the chucks 51 and 52 when in their carcass-receiving positions are disposed horizontally and have their free ends 53a—54a—55a facing frontwardly of the press 20 (out of the plane of the paper in FIG. 2). When the chucks 51 and 52 are in this position, the respective segments 53 are lowermost and the associated segments 54 and 55 uppermost. For the purpose of receiving the uncured carcasses 25, of course, the chucks 51 and 52 are collapsed as shown in FIGS. 1 and 2. The carcasses can be fed to the chucks in any desired manner, automatically or otherwise. Although the specific mechanism which is employed to bring the carcasses 25 to the chucks 51 and 52 does not constitute a part of the present invention, such a mechanism merely by way of example may comprise a pair of shuttle cars 67 and 68 such as are disclosed in a copending application of E. B. Erickson et al., Serial No. 838,482, filed September 8, 1959, for Automatic Tire Carcass Loading Apparatus. The cars 67 and 68 are mounted for automatic reciprocal linear movement toward and away from the chucks on any suitable rail structure 69. The relative arrangement of the chucks and shuttle cars is such that when carcasses 25 are located on the latter, they are in substantially axial alignment with their respective chucks, and that the chucks will enter the carcasses substantially axially of the latter and usually without touching the same when the shuttle cars move to their terminal locations under the chucks, as illustrated in broken lines in FIG. 1.

It will be understood that when this has occurred, the chucks can be expanded to contact the carcasses 25 from the inside. During such expansion, the pairs of segments 54 and 55 first rise relative to the respective stationary segments 53 until they contact the upper halves of the carcasses 25. As the segment pairs 54—55 rise further, the carcasses are raised from their respective shuttle cars 67 and 68 until the lower halves of the carcasses 25 contact the respective chuck segments 53, whereupon the shuttle cars can be retracted to their starting positions for receiving the next set of raw carcasses 25. The maximum expansion of the chucks 51 and 52 is, of course, limited by the surrounding tire carcasses, so that the latter, when contacted by all the chuck segments, are firmly gripped by and retained on the chucks for transfer to the press.

The means for swinging the chucks 51 and 52 through a predetermined angle from their receiving positions to their discharging or mold-loading positions are best shown in FIGS. 1, 2 and 3, reference also being had to FIGS. 6, 7 and 8. Referring first to FIGS. 1 to 3, a vertical structural or frame member 70 is welded or otherwise rigidly affixed to the support member 43 at the front of the press base 21. A double-acting pneumatic cylinder 71 in which a piston 72 is arranged for reciprocal movement is mounted on the frame member 70. The piston 72 carries a piston rod 73 which extends upwardly out of the cylinder 71 and is connected at its upper end with a vertical rack 74. The teeth of the rack 74 mesh with the teeth of a pinion or spur gear 75 which is fixedly mounted on and rotatable with the jack shaft 48 (see FIG. 6). The back edge of the rack 74 is engaged by a roller 76 rotatably supported by the frame member 70 for the purpose of preventing disengagement of the rack from the gear during operation of the transfer system.

Referring now with greater particularity to FIGS. 6, 7 and 8, it will be seen that the frame member 70 is provided adjacent its upper end with a horizontal plate 77 which is welded to the frame member and also bolted to a horizontal plate 43a at the top end of the support member 43. Welded to the plate 77 and projecting beyond the free edge thereof in a direction essentially parallel to the axis of the jack shaft 48 is a tubular stop or abutment member 78. Keyed to the jack shaft 48 at a location between the bearing 45 and the cross-shaft 47 is a cross bar 79. A bolt 80 securely clamps the cross bar 79 to the jack shaft 48. At its opposite ends, the cross bar carries a pair of substantially parallel set screws 81 and 82 which protrude beyond the opposite faces of the cross bar and the axial positions of which on the cross bar can be adjusted and fixed by respective nuts 81' and 82'. As clearly shown in FIGS. 7 and 8, the tips 81a and 82a of the set screws 81 and 82 which project from the cross bar 79 on the side thereof facing the tubular stop 78 are adapted to engage the latter.

It is apparent, therefore, that when the cross bar 79 is in the position illustrated in FIG. 7, with the tip 82a of the set screw 82 abutting against the stop 78, the chucks 51 and 52 are in their carcass-receiving positions as shown in FIGS. 1 and 2, while rotation of the cross bar with the shaft 48 to bring the tip 81a of the set screw 81 into engagement with the stop 78 (see FIG. 8) causes the chucks to be swung along a downward arc through the broken-line positions thereof shown in FIG. 3 until they are located at the solid-line positions shown in FIGS. 3 and 4. The setting of the screws 81 and 82 thus controls the extent of the angular swinging movement of the chucks for a purpose which will be more fully explained presently.

Although the operation of the loading system according to the present invention will be clear from the foregoing description, it is deemed advisable at this point to set forth one complete cycle of such operation. It is assumed, as a starting point, that the press 20 has just been closed, as shown in FIG. 2, with the upper mold sections 41 and 42 being in their lowered positions, and with two tires in the process of being cured being located in the molds. The chucks 51 and 52 at this time are disposed in their horizontal receiving positions in a collapsed condition (see also FIG. 10).

The conveyor means constituted by the shuttle cars 67 and 68 are now actuated, as with the aid of suitable pneumatic motors, to advance the cars toward the respective chucks 51 and 52. Inasmuch as the carcasses 25 on the shuttle cars 67 and 68 are usually disposed substantially coaxially with the chucks, the latter enter the central spaces of the carcasses 25 and permit the shuttle cars to reach their terminal positions under the chucks, as illustrated in broken lines in FIG. 1. However, even if the carcasses 25 are not accurately positioned on the shuttle cars 67 and 68 to such an extent that the leading bead edges of the carcasses come in contact with the front edges of the chucks, such contact does not interfere with the positioning of the carcasses about the chucks, due to the presence of the hereinbefore mentioned inwardly turned or chamfered end edges 53a, 54a and 55a of the chuck segments 53, 54 and 55.

The respective pistons 61 in the chuck-operating cylinders 56 are now advanced from their rear end positions as shown in FIG. 10 to their front end positions as shown in FIG. 11 by admission of fluid pressure into the cylinder spaces 56″ througth the conduits 58″. As the pistons move along the cylinders, the pins 63 riding along the slots 64 cause the sleeves 65 to be likewise moved along the cylinders toward the front ends of the latter. In view of the fact that the cross-shaft 47 is stationary at this time, the lowermost segments 53 of the chucks 51 and 52 also are stationary, while the respective pairs of segments 54 and 55 move upwardly and away from the segments 53 until the chucks are in their expanded condition illustrated in FIG. 11 (see also FIG. 9). During this expansion of the chucks, the uppermost pairs of segments 54 and 55 first come into engagement with the upper halves of the carcasses 25 (the bottoms of which still rest on the shuttle cars 67 and 68) and thus raise the carcasses off the respective shuttle cars. The expansion of the chucks continues until interrupted by the constricting effect of the surrounding carcasses 25, which essentially coincides with the lower halves of the carcasses coming into contact with the stationary chuck segments 53. As soon as the carcasses are free of the shuttle cars, the latter are retracted by their pneumatic motors to their starting positions illustrated in solid lines in FIGS. 1 and 3 preparatory to receiving the next pair of raw tire carcasses.

It might be noted at this point that raw tire carcasses which have been kept in a storage bank for some time between the building and curing operations have a tendency to flatten out axially and thus to become somewhat egg-shaped. In the old 45° and 60° "Bag-O-Matic" presses which had to be loaded manually prior to the present invention, this was a handicap and a source of considerable irritation to the operators faced with the task of fitting the oval carcasses over the round curing bags. The chuck construction of the present invention materially aids in overcoming this drawback, by virtue of the fact that an expanded chuck of this type is capable of exerting sufficient radially outward forces on any oval or out-of-round carcass gripped thereby to return such carcass into its intended round shape.

When the tires in the press are fully cured, the molds are opened by raising the upper mold sections 41 and 42 through the intermediary of the mechanism 28 to 40, whereupon the finished tires are stripped from the lower mold sections 22 and 23 and removed from the press 20 frontwardly or rearwardly of the latter by any suitable mechanisms (not shown) which are designed for performing these functions and constitute no part of the present invention. As the tires are being removed from the press, fluid pressure is admitted into the top end of the cylinder 71 to lower the piston 72 and therewith the rack 74. The rotation of the pinion 75 engendered by the descent of the rack 74 causes the jack shaft 48 and cross-shaft 47 to be rotated in a counterclockwise direction as seen in FIGS. 7 and 8. By virtue of such rotation, the cross bar 79 is moved from the position thereof shown in FIG. 7 to the solid-line position shown in FIG. 8, and concurrently therewith the chucks 51 and 52 are swung from their solid-line positions shown in FIGS. 1 and 2 to the solid-line position shown in FIG. 3, with the segments 53 now being uppermost. Due to the pressure of the chuck segments 53, 54 and 55 against the interior surfaces of the carcasses 25, the latter, of course, are still firmly gripped by the chucks and cannot slide off the latter during this downward swinging movement.

With the chucks extending into the press openings as shown in FIG. 3, i.e. with their axes oriented at a predetermined angle relative to the vertical and thus to the axes of the curing bags 24, fluid pressure is admitted into the spaces 56′ of the cylinders 56 through the conduits 57″ to shift the pistons 61 from their front end positions illustrated in FIG. 11 to their rear end positions illustrated in FIG. 10. As a result, the chucks are collapsed from their expanded condition shown in broken lines in FIG. 9 to their solid-line condition shown in FIGS. 4 and 9 by virtue of the pairs of segments 54 and 55 being drawn toward their respective stationary segments 53. As the chucks collapse, therefore, the carcasses 25 begin to slide along the segments 53 and downwardly toward the curing bags 24. Referring specifically to FIG. 4, it will be apparent that after the start of this sliding movement the lowermost points of the leading peripheral bead edges of the carcasses 25 are the first parts of the carcasses to make contact with their associated curing bags 24 near the top ends of the latter. Thereafter, as the sliding movement continues, the carcasses 25 are effectively fulcrumed at the areas of such contact and pivot in vertical planes rearwardly of the press, i.e. toward the respective upper mold sections 41 and 42, until they have dropped completely off the stationary segments 53 and over their respective curing bags 24. Due to the frictional contact between the carcasses and the curing bags 24, however, the downward sliding of the carcasses toward the lower mold sections 22 and 23 is effected at a greatly reduced speed. In this manner, the possibility of the carcasses rebounding from the lower mold sections upon contacting the latter and thereafter coming to rest off-center on their respective mold seats is substantially eliminated.

As soon as the carcasses are completely free of their respective collapsed chucks 51 and 52, fluid pressure is admitted into the cylinder 71 at the bottom end thereof to raise the piston 72 and therewith the rack 74. The concurrent rotation of the pinion 75, jack shaft 48 and cross-shaft 47 (clockwise as seen in FIGS. 7 and 8) thus raises the chucks from their downwardly slanted discharging or mold-loading positions illustrated in FIG. 4 to their initial and horizontal carcass-receiving positions illustrated in FIGS. 1 and 2. When the chucks have cleared the confines of the press, the motor (not shown) driving the cam wheels 36 and 37 is again set into operation so as to lower the upper mold sections 41 and 42 onto the lower mold sections 22 and 23 and the carcasses 25 (shown in broken lines in FIG. 3) surrounding the curing bags 24 for the beginning of the next curing cycle.

As this curing cycle proceeds, another pair of carcasses 25 to be cured is loaded onto the chucks 51 and 52, whereupon the entire sequence of operations is repeated, as hereinbefore described.

It will, of course, be evident that it may at times be necessary to change the final downward inclination of the chucks 51 and 52 at their discharging or mold-loading positions. Merely by way of example, let it be assumed that the press has been in operation manufacturing 8.20–15 tires and that it is now desired to produce 7.10–15 tires. It is, therefore, necessary to employ not only smaller mold sections 22—41 and 23—42 but also shorter curing bags, due to the fact that the tires to be produced have smaller cross-sections. Such shorter curing bags are indicated in solid lines at 24a in FIG. 5, with the previously employed longer curing bags 24 being indicated in broken lines solely for purposes of comparison. Since the curing bags 24a are shorter than the bags 24, the chucks 51 and 52 cannot, of course, be swung over as far as they are in the case of the larger curing bags if the stationary segments 53 are to be properly positioned to permit the leading bead edges of the smaller carcasses 25′ to contact the bags 24a as and with the objectives described herebefore in connection with FIG. 4. Again merely for comparison purposes, the discharging positions of the chucks are illustrated in FIG. 5 in broken lines for the larger carcasses 25 and in solid lines for the smaller carcasses 25′. In order to ensure that the chucks when in their discharging positions are located at the proper inclinations within the press openings corresponding to the sizes of the curing bags and carcasses, the set screw 81 in the cross bar 79 is adjusted with the aid of the nut 81′ in such a manner that, by virtue of the extent to which the screw tip 81a projects from the bar 79, the downward swinging movement of the chucks for the smaller size tires is terminated sooner than the corresponding downward movement for the larger size tires. The position of the cross bar 79 under such circumstances is illustrated in broken lines in FIG. 8.

As will be readily understood by those skilled in the art, the press and the associated carcass transfer or loading system disclosed herein are equipped with such timing devices, control switches and related circuitry, and control valves for the fluid pressure systems, as are required for the purpose of effecting the various sequential operations of the press and the loading system during each complete tire-forming cycle. In view of the fact that such control circuits, switches and valves, as well as their arrangements and interrelationships are matters of conventional practice and well within the ken of any skilled electrician or mechanic, it is not deemed necessary to illustrate the said control elements or to describe the same in this application. In this connection, it is to be noted that the principles of the present invention, although disclosed specifically in relation to a dual-type press, are equally applicable to single unit presses having the same general characteristics.

It will also be clear from the foregoing description that the disclosed means for conveying the raw carcasses 25 to the transfer chucks 51 and 52 may be replaced by other types of conveyors, and that it is not absolutely necessary that the carcasses be fed horizontally onto the chucks. Merely by way of example, belt-type conveyors may be employed in lieu of the shuttle cars 67 and 68, and the arrangement may be such that the emptied conveyors can move away from the chucks without waiting for the expansion of the latter to raise the carcasses, as is required in the case of the shuttle cars. Alternatively, the raw carcasses may be placed onto the chucks by hand. Moreover, the chucks need not be horizontal when receiving the carcasses, provision being made for such an eventuality by the presence of the adjustable set screw 82. Thus, where the screw tip 82a projects to a greater or lesser extent from the cross bar 79 than shown, the receiving positions of the chucks are slanted up or down from the horizontal to a corresponding degree.

The press loading system of the present invention is, furthermore, not restricted to the use of three-segment chucks constructed as described and illustrated herein. Quite to the contrary, the number of segments of which each chuck is composed may differ from three and may be as low as two or as high as desired. It is evident, of course, that the ultimate choice of the exact number of segments for each chuck will depend on a number of factors, such as the need for providing segment-moving linkage systems as simple and inexpensive to construct as possible, the provision of an optimum number of segments capable of ensuring the desired degree of rounding of distorted carcasses, etc. It is on these grounds that the use of three-segment chucks is preferred. Regardless of the actual number of segments, however, each multi-segment chuck according to the present invention must be so constructed and arranged that it has one segment which is stationary during the expansion or collapsing of the chuck, and that this stationary segment is disposed uppermost during the loading of the press so as to provide a stationary slide surface along and from which a carcass to be loaded into the associated press mold can slide onto a vertical curing bag. In view of the fact that the operation of the loading system is always the same as long as the aforesaid condition is met, it is not deemed necessary to illustrate the system in conjunction with such other types of multi-segment chucks.

It is to be understood, therefore, that the foregoing description of the present invention is for purposes of illustration only, and that the invention is susceptible to a number of changes and modifications none of which involves any departure from the spirit and scope of the invention as defined in the appended claims.

Having thus described my invention, what I claim and desire to secure by Letters Patent is:

1. An expansible and collapsible tire carcass transfer chuck, comprising an elongated substantially tubular body composed of a plurality of coextensive parallel segments each of which is arcuate in cross-section and convex outwardly of said body, a pair of telescoping power members disposed parallel to said segments in the interior of said body as defined by said segments, said telescoping power members comprising a double-acting fluid pressure cylinder and a piston slidable reciprocally in said cylinder, a sleeve slidably surrounding said cylinder, said cylinder being provided with two longitudinal diametrically opposite slots, and a cross pin carried by said piston, the opposite ends of said cross pin extending through and riding along said slots and being connected to said sleeve, means fixedly connected to one of said segments at one end thereof and supporting the same for angular movement about an axis transverse to the longitudinal dimension of said one segment, first links connecting said power members individually to said one segment of said body, second links connecting said power members individually to the other segments of said body, said first and second links being connected to said cylinder and to said sleeve, whereby said power members are movably supported by said one segment while said other segments are movably supported by said power members, so that during expansion and collapse of the chuck upon corresponding telescoping motions of said power members the latter move radially away from and toward said one segment while said other segments move radially away from and toward said power members as well as out of and into edge to edge abutting relationship with said one segment, said one segment being so connected to said supporting means as to be disposed uppermost and concave downwardly when said body is inclined in a downward direction to define a slide surface which is stationary and permits a previously internally gripped tire carcass to slide from said body along fixed path.

2. Apparatus for angularly loading raw tubular tire carcasses into a tire press having a pair of separable upper and lower carcass-shaping and curing mold sections the lower one of which is horizontal and stationary and supports a vertical curing bag, and the upper one of which is movable angularly upwardly and downwardly relative to said lower mold section only to such an extent that said press when open is not adapted for vertical loading of tire carcasses about said curing bag, said apparatus comprising an expansible and collapsible elongated, substantially tubular chuck composed of a plurality of coextensive parallel segments each of which is arcuate in cross-section and convex outwardly of the chuck, a pair of telescoping power members disposed parallel to said segments in the interior of said chuck as defined by said segments, support means, horizontally rotatable shaft means journaled on said support means, one of said segments being fixedly connected at one end thereof to said shaft means and extending substantially radially from the latter so as to be lowermost and concave upwardly when the chuck is directed away from said press and in position to receive a tire carcass, first links connecting said power members individually to said one segment of said chuck, second links connecting said power members individually to the other segments of said chuck, whereby said power members are movably supported by said one segment while said other segments are movably supported by said power members, so that during expansion and collapse of the chuck upon corresponding telescoping motions of said power members the latter move radially away from and toward said one segment while said other segments move radially away from and toward said power members as well as out of and into edge to edge abutting relationship with said one segment, and means for rotating said shaft means for moving said chuck angularly between its carcass-receiving position and a carcass-discharging position in which it is directed toward the press and at a downward inclination toward said curing bag so as to dispose said one segment uppermost and concave downwardly to define a slide surface which is stationary relative to said curing bag during the collapse of said chuck while the latter is stationary at said discharging position, thereby to permit a previously internally gripped carcass to slide from said chuck on and along said stationary surface angularly onto said curing bag so as to settle at a slow rate of speed downwardly about the latter and in said lower mold section.

3. In combination, a tire press having a pair of separable upper and lower carcass-shaping and curing mold sections the lower one of which is horizontal and stationary and the upper one of which is movable angularly upwardly and downwardly relative to said lower mold section, and a vertical curing bag seated centrally in said lower mold section, an expansible and collapsible elongated, substantially tubular tire carcass transfer chuck composed of a plurality of coextensive parallel segments each of which is arcuate in cross-section and convex outwardly of the chuck, a pair of telescoping power members disposed parallel to said segments in the interior of said chuck as defined by said segments, a horizontally rotatable shaft, one of said segments being fixedly connected at one end thereof to said shaft and extending substantially radially from the latter so as to be lowermost and concave upwardly when the chuck is directed away from said press and in position to receive a tire carcass, first links connecting said power members individually to said one segment of said chuck, second links connecting said power members individually to the other segments of said chuck, whereby said power members are movably supported by said one segment while said other segments are movably supported by said power members, so that during expansion and collapse of the chuck upon corresponding telescoping motions of said power members the latter move radially away from and toward said one segment while said other segments move radially away from and toward said power members as well as out of and into edge to edge abutting relationship with said one segment, means for rotating said shaft for moving said chuck angularly between its carcass-receiving position and a carcass-discharging position in which it is directed toward said press and at a downward inclination toward said curing bag so as to dispose said one segment uppermost and concave downwardly to define a slide surface which is stationary relative to said curing bag during the collapse of said chuck while the latter is stationary at said discharging position, thereby to permit a previously gripped carcass to slide from said chuck on and along said stationary surface angularly onto said curing bag so as to settle at a slow rate of speed downwardly about the latter and in said lower mold section preparatory to the closing of said upper and lower mold sections, and control means operatively connected with said upper mold section, said power members and said means for rotating said shaft for ensuring actuation of the same cyclically and in proper sequence during each cycle.

4. In combination, a dual tire press having a base, two sets of separable upper and lower carcass-shaping and curing mold sections the lower ones of which are horizontal and stationarily mounted on said base and the upper ones of which are movable angularly upwardly and downwardly relative to the respective lower mold sections, and a pair of vertical curing bags seated centrally in said lower mold sections, respectively, a pair of expansible and collapsible elongated, substantially tubular tire carcass transfer chucks each composed of a plurality of coextensive parallel segments, all of said segments being arcuate in cross-section and convex outwardly of the respective chucks, two pairs of telescoping power members disposed, respectively, parallel to said segments of said chucks and in the interiors of the latter as defined by the associated segments, a horizontally rotatable shaft, one of said segments of each chuck being fixedly connected at one end to said shaft and extending substantially radially from the latter and in parallel relationship to one another so as to be lowermost and concave upwardly when the chucks are directed away from said press to receive a pair of tire carcasses, two sets of first links each connecting said power members of a respective chuck individually to said one segment of the same chuck, two sets of second links each connecting said power members of a respective chuck individually to the other segments of the same chuck, whereby each pair of said power members is movably supported by said one segment of a respective chuck while said other segments of each chuck are movably supported by the associated pair of said power members, so that during expansion and collapse of the chucks upon corresponding telescoping motions of said pairs of power members the latter move radially away from and toward said one segment of their respective chucks while said other segments move radially away from and toward their respective pairs of power members as well as out of and into edge to edge abutting relationship with their associated one segment, means for rotating said shaft for moving said chucks jointly between their carcass-receiving positions and their carcass-discharging positions in which they are directed toward said press and at a downward inclination toward said curing bags so as to dispose said one segment of each chuck uppermost and concave downwardly to define a slide surface which is stationary relative to the respective one of said curing bags during the collapse of said chucks while the latter are stationary at said discharging positions, thereby to permit the previously gripped carcasses to slide from said chucks on and along said stationary surfaces angularly onto said curing bags so as to settle at a slow rate of speed downwardly about the latter and in said lower mold sections preparatory to the closing of said upper and lower mold sections, and control means operatively connected with said upper mold sections, said power members and said means for rotating said shaft for ensuring actuation of the same cyclically and in proper sequence during each cycle.

References Cited in the file of this patent

UNITED STATES PATENTS

| | | |
|---|---|---|
| 1,868,562 | Chubb et al. | July 26, 1932 |
| 2,927,343 | Soderquist | Mar. 8, 1960 |